UNITED STATES PATENT OFFICE.

AUGUST W. ANDERSEN, OF GALESBURG, ILLINOIS, ASSIGNOR TO THE COPPER AND STEEL WELDING COMPANY, OF SAME PLACE.

WELDING METALS.

SPECIFICATION forming part of Letters Patent No. 628,427, dated July 4, 1899.

Application filed October 21, 1898. Serial No. 694,214. (No specimens.)

*To all whom it may concern:*

Be it known that I, AUGUST W. ANDERSEN, a citizen of the United States, residing at Galesburg, in the county of Knox and State of Illinois, have invented certain new and useful Improvements in Welding Metals; and I do hereby declare the following to be a full, clear, and exact description of the invention, such as will enable others skilled in the art to which it appertains to make and use the same.

The object is in a simple, ready, and thoroughly effective manner to weld copper with itself or to weld together copper and steel or iron or to weld together copper and brass.

The invention consists of a welding flux or compound and in the method of welding together different metals and alloys and copper, as will be hereinafter fully described and claimed.

In carrying my invention into effect in the welding together of copper and different metals and alloys—such as iron, steel, brass, &c.—I employ a flux the reducing agent of which is potassium ferrocyanid. This agent may be combined with various substances to present an efficient and readily-applicable compound, and in this instance I describe three combinations of substances in which the potassium ferrocyanid is employed, either of which combinations will operate with perfect satisfaction and uniformity of action.

The first, simplest, and most easily made compound consists of borax, pulverized clay or other silicious matter, and potassium ferrocyanid in about the following proportions by weight: borax, two parts; pulverized clay, one part; potassium ferrocyanid, one-eighth part. The second of these compounds consists of borax, pulverized copper, white vitriol, and potassium ferrocyanid in about the following proportions, by weight; borax, two parts; pulverized copper, one-half part; white vitriol, three-eighths part; potassium ferrocyanid, one-eighth part. The third of these compounds consists of blue vitriol, borax, and potassium ferrocyanid in about the following proportions, by weight: blue vitriol, two-eighths part; borax, two and one-fourth parts; potassium ferrocyanid, two-eighths part.

In carrying my invention into effect in welding together two pieces of copper the two ends or surfaces to be united are placed together in close contact and heated to a cherry-red. The two pieces of metal are then removed from the fire and either of the above-described fluxes is sprinkled on the faces to be united. The metal is then reheated to the proper point for welding, is again removed from the fire, and subjected to pressure, as by hammering or rolling, to weld the pieces together.

In welding together copper and steel or iron the two pieces of metal to be united are placed in the fire with the copper uppermost and exposed to the air. Sufficient heat is now directly applied to the piece of iron or steel, as the case may be, to bring it to a cherry-red, and the two pieces are then removed from the fire and either one of the above-described fluxes is sprinkled on the faces to be united. The two pieces of metal, with the copper uppermost, are reintroduced into the fire and heated to a point near that of fusion of the copper, or to a point when the iron or steel is soft enough to weld, and the metals are then withdrawn and subjected to pressure, as by hammering or rolling, to weld the pieces together.

In welding together copper and brass the same steps are followed as in welding together copper and iron or steel, except that the brass must be uppermost while the metals are undergoing heating.

It is to be understood that I do not limit myself to the proportions of the different substances in the respective compounds here given, as they may be varied without departing from the spirit of my invention.

Having thus fully described my invention, what I claim as new, and desire to secure by Letters Patent, is—

1. A welding flux, one of the ingredients of which is potassium ferrocyanid, substantially as described.

2. A welding flux composed of borax, pulverized clay, and potassium ferrocyanid, in about the proportions specified, substantially as described.

3. A welding flux composed of the following substances by weight: borax, two parts;

pulverized clay, one part; potassium ferrocyanid, one-eighth part, substantially as described.

4. The method of welding copper, and steel, or iron, which consists in placing the copper and the iron, or steel, together in a fire, with the copper uppermost, and exposed to the air, then heating the under metal to a cherry-red, then removing the two metals from the fire and applying to the faces to be united a flux containing potassium ferrocyanid, then reintroducing the metals into the fire with the copper uppermost, then heating the metals to a point near that of fusion of the copper, and then withdrawing the metals and hammering or rolling them together, substantially as described.

5. The method of welding copper and brass, which consists in placing the copper and brass, together, in a fire, with the brass uppermost, and exposed to the air, then heating the under metal to a cherry-red, then removing the two metals from the fire and applying to the faces to be united a flux containing potassium ferrocyanid, then reintroducing the metals into the fire with the brass uppermost, then heating the metals to the proper heat for welding, and then withdrawing the metals and hammering or rolling them together, substantially as described.

6. The method of welding copper with itself, which consists in heating the pieces of copper to a cherry-red, then removing the pieces and applying to the faces to be united a flux containing potassium ferrocyanid, then reheating the pieces, and, finally, hammering or rolling them together, substantially as described.

In testimony whereof I affix my signature in presence of two witnesses.

AUGUST W. ANDERSEN.

Witnesses:
NELS NELSON,
J. A. PETERSON.